UNITED STATES PATENT OFFICE.

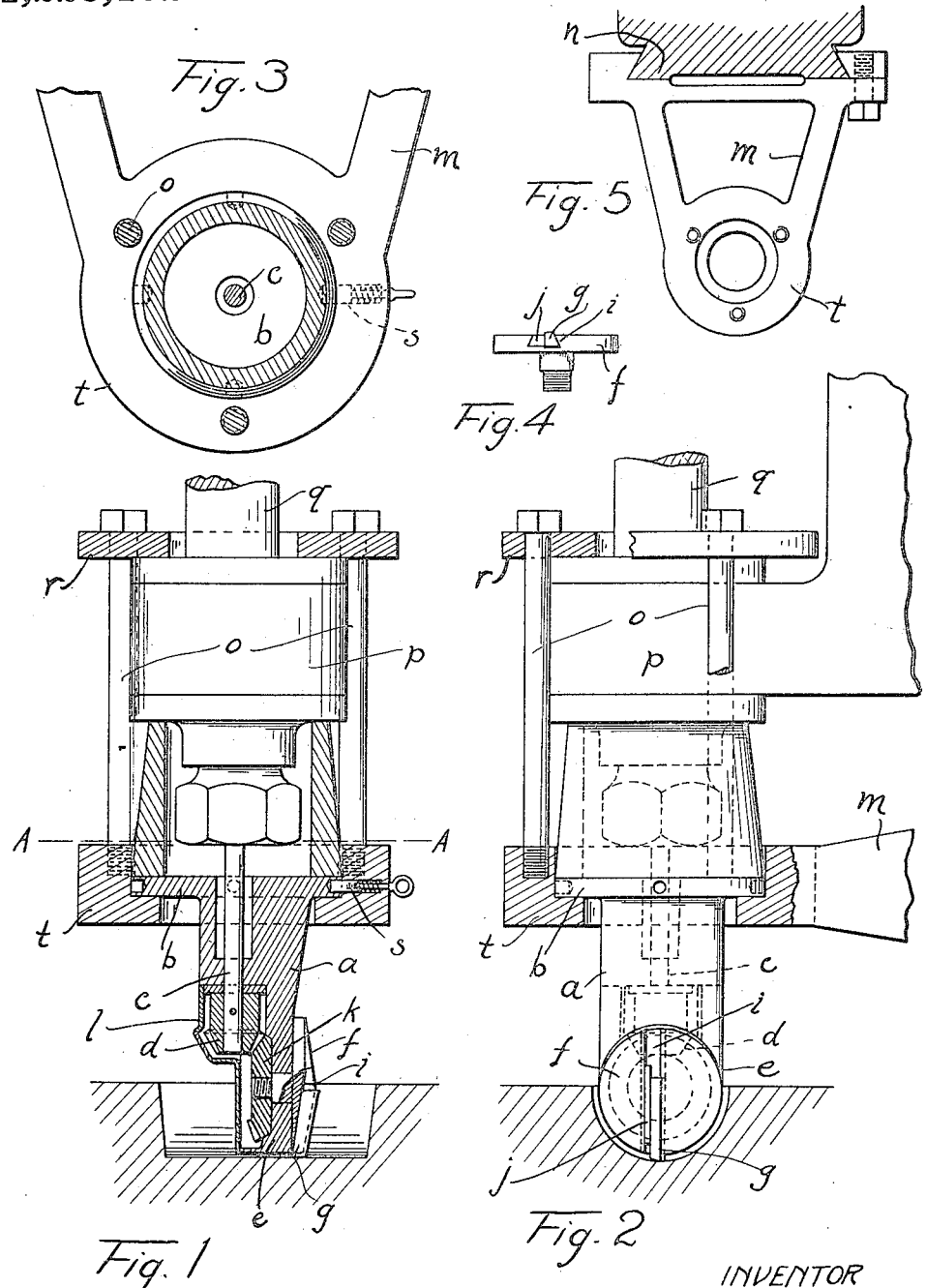

HERMAN W. MELLING, OF JACKSON, MICHIGAN.

TOOL AND TOOL-CARRIER.

1,225,152. Specification of Letters Patent. Patented May 8, 1917.

Application filed March 31, 1916. Serial No. 87,922.

*To all whom it may concern:*

Be it known that I, HERMAN W. MELLING, a citizen of the United States, residing at Jackson, county of Jackson, State of Michigan, have invented a certain new and useful Improvement in Tools and Tool-Carriers, and declare the following to be a full, clear, and exact description of the same, such as will enable others skilled in the art to which it pertains to make and use the same, reference being had to the accompanying drawings, which form a part of this specification.

This invention relates to tools and tool-carriers for cutting out a semi-cylindrical cavity, and is especially designed as a die-sinking tool and carrier.

The invention consists in an arrangement of elements whereby the tool may be adjusted to cut at varying depths in a very simple and efficient manner. The invention also consists of a tool-carrier which may be adjusted to cut in a plurality of different directions. The tool-carrier is provided with simple yet suitable driving connections to transmit the rotary motion of a rotating vertical spindle into rotating movement of the tool upon a horizontal axis. My preferred embodiment of the apparatus to accomplish this purpose will more fully appear in the description following.

In the drawings,—

Figure 1 is a vertical cross section of the tool-carrier showing it connected up with a head of a milling machine provided with a vertical rotating spindle.

Fig. 2 is a side elevation with some of the parts sectioned, of the same device shown in Fig. 1.

Fig. 3 is a horizontal section on the line A—A of Fig. 1.

Fig. 4 is a detail of the disk to which the tool is immediately attached.

Fig. 5 is a plan view of the sliding bracket in which the tool-carrier is held.

$a$ designates the tool-carrier which comprises a circular or disk-like head $b$ and a depending tapering shank having a passageway axial to the circular head to journal the rotating spindle $c$ upon whose lower end is pinned a beveled gear $d$. The lower end of this tapering shank has a disk-like extension $e$ offset to the axis of the carrier and at the center of this extension is journaled the disk $f$ which carries the cutting tool $g$. This cutting tool slides into a dovetailed cross groove $i$ in the face of the disk and may be adjusted for cutting at various depths by reason of the use of the tapered key $j$ which together with the tool itself is shaped to be complementary to the dove-tailed groove in the manner of a dove-tailed tongue and groove. The disk $f$ is provided with a stub axle which fits into the disk-like extension $e$ of the carrier and which screws into the beveled driven gear $k$ that meshes with the driving gear $d$. A removable cover $l$ of stamped metal is arranged to fit over the gears, and together with the main portion of the shank $a$ forms a housing therefor to prevent chips of metal getting into the gears.

A casting forming a bracket $m$ is arranged to slide on the dove-tailed guide $n$ of the milling machine. This comprises an annulus $t$ held on a pair of extended arms and provided with a concentric countersink in its top surface to receive the disk-like head $b$ of the tool-carrier. This annulus is provided with three upright bolts $o$ by which the bracket may be secured to the head $p$ which journals the rotating spindle $q$ of the milling machine, the clamping ring $r$ being clamped over the top of this head for screwing the bolts down. The rotating spindle $c$ of the carrier may be caused to enter and be clamped in a chuck at the end of the rotating spindle $q$ of the milling machine. The periphery of the disk-like head $b$ of the carrier is notched preferably in four places and the spring dowel pin $s$ in the annulus $n$ of the bracket serves to keep the tool-carrier in any one of the several angular positions of adjustment that can thus be accomplished so that the tool can be made to cut in a plurality of directions— in the embodiment shown in the drawings in four different directions.

From the above description it will be seen that I have designed a very effective die-sinking tool which may cut in a plurality of directions, may be coupled up with the rotating spindle of a milling machine, and which is very simple to construct.

What I claim is:

1. In a device of the character described, the combination of a tool-carrier comprising a shank and a disk-like head provided with notches in its periphery, a spindle journaled in the shank, an extension on the shank, a disk journaled in said extension, a beveled gear located on the end of the spindle, a second beveled gear secured to the axle of the disk and meshing with the first-mentioned beveled gear, a tool carried by the said disk, and means for engaging in the said notches for holding the tool-carrier in various angular positions.

2. In a device of the class described, the combination of a tool-carrier comprising a shank and a disk-like head, the latter provided with notches in its periphery, an annulus in which the same sets, a spring dowel pin secured in the annulus and adapted to engage at different times in the said notches, a rotating spindle journaled in the shank, a disk rotatably journaled at the end of the shank on an axis at substantially right angles to the axis of the spindle, a cutting tool carried by the disk, and a pair of intermeshing beveled gears connecting the rotating spindle and the disk.

3. In a device of the class described, the combination of a tool-carrier comprising a disk-like head having a plurality of notches in its outside surface and a shank, a bracket in which the disk-like head is supported, a rotating spindle journaled in the shank, means on said bracket for engaging in the notches at various times to secure angular adjustment of the tool carrier, a rotating spindle journaled in the shank, a beveled gear on the end thereof, a disk journaled in the end of the shank at right angles to the spindle, a cutting tool carried by the disk, and a beveled gear secured to the disk and meshing with the first-mentioned beveled gear.

4. In a device of the character described, a tool-carrier comprising a shank and a disk-like head, a spindle rotatably journaled therein, a beveled gear on the end thereof, the said shank being provided with a flat web-like extension, a disk having an axle journaled in said extension and located immediately to the outside of the extension, a beveled gear on the end of the spindle, a beveled gear on the end of the axle and located immediately to the inside of the extension, the two said gears meshing, and a cutting tool projecting peripherally from the disk.

5. In a die sinking tool or routing tool, the combination of a tool carrier comprising a substantially solid shank having a downwardly extending web terminal located at one side of the axis of the shank and comprising a disk-like head offset to the axis of the shank, means for rotatably holding the disk-like head, means for locking the disk-like head in two or more positions of angular adjustment about the axis of the head, a spindle journaled in the tool carrier axially of the disk-like head and offset from the axis of the shank, a beveled gear on the end of the spindle, a disk and beveled gear journaled together in the downwardly extending web terminal and the beveled gear meshing with the beveled gear on the end of the spindle, and a cutting tool carried by the disk.

In testimony whereof, I sign this specification.

HERMAN W. MELLING.

Copies of this patent may be obtained for five cents each, by addressing the "Commissioner of Patents, Washington, D. C."